United States Patent [19]

Arlon et al.

[11] Patent Number: 4,916,774
[45] Date of Patent: Apr. 17, 1990

[54] WINDSHIELD WIPER DRIVE MECHANISM WITH RETRACTED PARKING POSITION

[75] Inventors: Philippe Arlon, Ozoir; Jean-Pierre Eustache, Antony; Daniel Maubray, Issy, all of France

[73] Assignee: Valeo Systemes D'Essuyage, Issy-les-Moulineaux, France

[21] Appl. No.: 337,405

[22] Filed: Apr. 13, 1989

[30] Foreign Application Priority Data

Apr. 13, 1988 [FR] France .................... 88 04891

[51] Int. Cl.⁴ .................................. B60S 1/22
[52] U.S. Cl. ........................ 15/250.16; 74/70; 74/75
[58] Field of Search .......... 15/250.16, 250.15, 250.17, 15/250.29; 74/52, 70, 75, 600

[56] References Cited

U.S. PATENT DOCUMENTS

| | | | |
|---|---|---|---|
| 2,733,609 | 2/1956 | Latta | 15/250.17 X |
| 4,400,844 | 8/1983 | Hayakawa et al. | 74/70 X |
| 4,454,626 | 6/1984 | Schmidt et al. | 15/250.16 |
| 4,559,845 | 12/1985 | Fallows | 15/250.16 X |
| 4,686,733 | 8/1987 | Sahara | 74/70 X |
| 4,791,698 | 12/1988 | Murata | 74/50 X |

FOREIGN PATENT DOCUMENTS

| | | |
|---|---|---|
| 2143271 | 3/1972 | Fed. Rep. of Germany . |
| 59-190648 | 4/1985 | Japan ..................... 74/70 |
| 2141021 | 12/1984 | United Kingdom . |

Primary Examiner—Frankie L. Stinson
Attorney, Agent, or Firm—Wenderoth, Lind & Ponack

[57] ABSTRACT

A windshield wiper drive mechanism includes a crank driven by a motor shaft and having, towards the end of the crank remote from the motor shaft, a crank pin carrying an eccentric crank head piece on which a crosshead is pivoted. The head piece carries a latch which includes a latch finger movable under the action of a resilient member and arranged to leave the crank head piece free to move with respect to the crank when the latter is rotating in a first direction, but to prevent such relative rotation when the crank is rotating in the opposite direction. The latch finger includes a radial latch arm extending outwardly, while the crosshead has a recess for receiving the latch arm. The crank head piece has an opening for receiving the free end of the latch finger. The latch arm is so positioned, and is of such thickness, that, when the latch finger is engaged in the opening in the crank, the latch arm lies between the face to face surfaces of the crosshead and of the crank. The crank head piece is placed so as to face towards the crank.

9 Claims, 3 Drawing Sheets

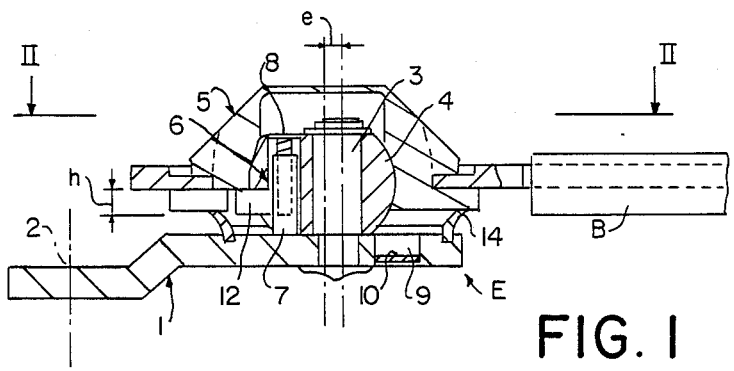
FIG. 1
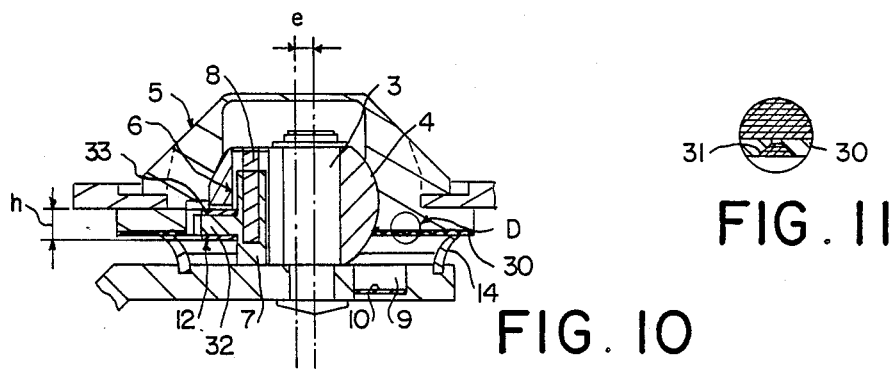
FIG. 10
FIG. 11
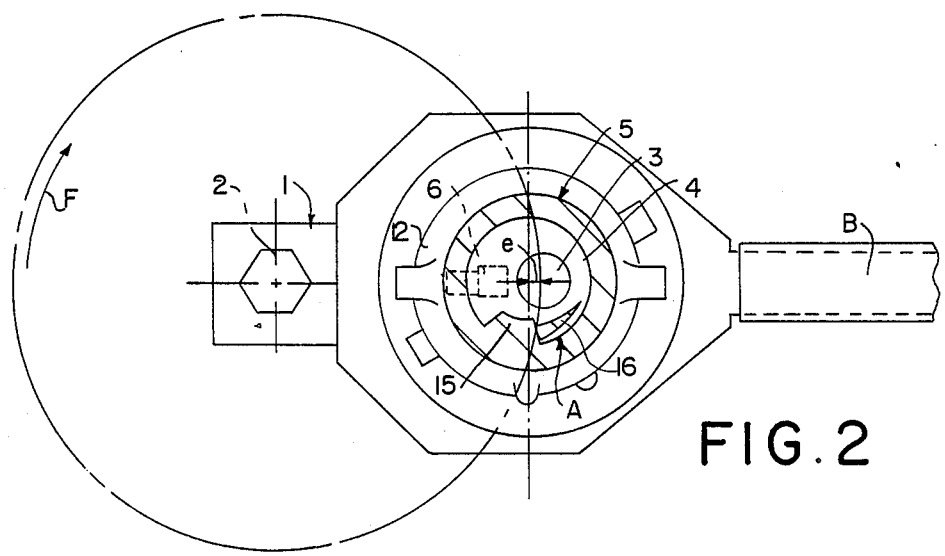
FIG. 2

WINDSHIELD WIPER DRIVE MECHANISM WITH RETRACTED PARKING POSITION

FIELD OF THE INVENTION

This invention relates to a drive mechanism for at least one windshield wiper of the kind that enables the wiper blade or blades to be retracted into a state which will be called a parking state, so as to enable the wiper or wipers to be moved to what is called a "park" position when not in use, this retraction being obtained by varying an eccentricity when reversing the sense of direction of a driving crank of the mechanism.

BACKGROUND OF THE INVENTION

Such a mechanism is generally of the kind that comprises a crank coupled with a motor shaft and having a crank pin mounted on the crank towards the end of the crank away from the motor shaft with a crank head piece mounted eccentrically on the crank pin and a crosshead pivoted on the crank head piece. The crank head piece incorporates a latch which comprises a latch finger movable in a direction substantially parallel to the axis of the crank pin under the action of resilient means. The mechanism includes selective coupling means including the latch, which acts in such a way as to leave the crank head piece uncoupled from the crank when the latter is rotating in a first direction, but to prevent relative movement between the head piece and the crank when the latter is rotating in the opposite direction. Stop means are also provided for coupling the crosshead and crank head piece for rotation together when the crank is rotating in the first direction.

In normal wiping operation of the mechanism defined above, the crank rotates in one direction for which the position of the eccentric head piece remains constant with respect to one of the other elements, namely the crosshead or the crank, while when the direction of crank rotation is reversed there is, instead, relative rotation between the head piece and that other element. This causes the eccentricity to change, which results in the wiper blade or blades being retracted into the parking state. Such a mechanism will be referred to as a mechanism of the kind specified.

It is known that with such a drive mechanism when the wiper assembly is not in use, with the wiper blade in the park position the blade lies below the visible edge of the bodywork in the vicinity of the glass. This enables the whole of the glass to be available to be seen through by the driver. Furthermore, from the aesthetic point of view, the windshield wiper is no longer visible above the line of the bodywork.

Hitherto various arrangements have been proposed for practical embodiments of such a drive mechanism which enable a windshield wiper or set of wipers to be moved into a park position. There is a need to improve these arrangements in terms both of their construction and of their operation.

SUMMARY OF THE INVENTION

A principal object of the invention is to provide a drive mechanism for at least one windshield wiper, being a mechanism of the kind specified which responds better than has hitherto been the case to the various exigencies of operation on the road, and which is of simple and economical construction while being reliable in operation.

According to the invention, a windshield wiper drive mechanism that enables the wiper blade or blades to be retracted into a parking state, and being of the kind specified, further comprises an outwardly directed radial latch arm carried by the latch finger, the wiper crosshead having a recess to receive the latch arm, and the crank having an opening for receiving a free end of the latch finger, the position and thickness of the latch arm being such that, when the latch finger is engaged in the opening in the crank, the latch arm is situated between face to face surfaces of the crosshead and of the crank respectively thereby to prevent the latch from disengaging from the opening by abutment of the latch finger against the crosshead the crank head piece being mounted in facing relationship with the crank.

Preferably, in the direction of rotation of the crank corresponding to normal wiping operation, the crank head piece is coupled in rotation with the crosshead the latch finger being arranged so that, in normal wiping operation, it lies against the upper face of the crank while its radial latch arm is engaged in the recess of the crosshead. Stop means between the crosshead and the crank head piece include unidirectional abutment means for effecting the coupling of the crosshead and crank head piece in simultaneous rotation. According to a preferred feature of the invention, the unidirectional abutment means comprise an inwardly directed stop projection formed in the crosshead, and a ramp on the upper face of the crank head piece for cooperating with the stop projection.

According to a further preferred feature of the invention, when the crank is rotating in its normal direction, i.e. during a normal wiping operation, the crank head piece is coupled with the crank in common rotation, with the latch finger being engaged in the opening in the crank and the radial latch arm engaged in the space lying between the crank and the crosshead, while retarding means are provided between the crosshead and the head piece so as to couple the crosshead and head piece together in common rotation when the direction of rotation of the crank is reversed, and in order to cause the latch finger to escape from the opening in the crank.

The invention embraces, besides those arrangements mentioned above, a number of other arrangements which will be more specifically addressed in the description of preferred embodiments which follows, and which is given by way of example only and with reference to the accompanying drawings The description and the drawings are in no sense to be taken as limiting.

BRIEF DESCRIPTION OF THE DRAWINGS

FIG. 1 is a partial view in vertical cross section, showing a driving mechanism for a windshield wiper, in accordance with the invention, with the various components shown in their relative positions for a normal wiping operation.

FIG. 2 is a view in cross section taken on the line II—II in FIG. 1.

FIG. 10 is a partial view showing a modification of the arrangement shown in FIG. 1.

FIG. 11 is a detail view of the small portion of the mechanism indicated in the circle at D in FIG. 10.

DESCRIPTION OF PREFERRED EMBODIMENTS

Figure 3:
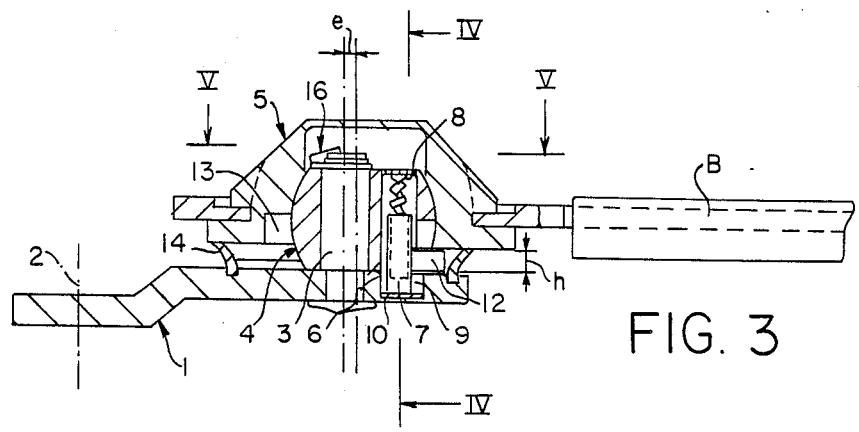
FIG. 3 is a view in cross section similar to FIG. 1, but with the components shown in the positions appropriate to the "park" position of the wiper.

Referring to the drawings, and particularly to FIGS. 1 to 5, these show a drive mechanism E for at least one windshield wiper (not shown) which allows the latter to be put into a "park" position as described above.

The mechanism E includes a crank 1 secured on a motor shaft 2 which is indicated only diagrammatically. The crank 1 has a crank pin 3 parallel with the axis of the shaft 2 and positioned near to the end of the crank remote from the motor shaft 2. The crank pin 3 is fixed to the crank 1 and carries a crank head piece 4, which is in the form of a bearing ring having a generally spherical outer surface. The head piece 4 is free to rotate on the crank pin 3, and is eccentric with respect to the latter by a distance e.

A connecting rod B has a crosshead 5 which is pivoted on the crank head piece 4. The head 5 has a spherical, concave inner surface which conforms with, and engages, the outer surface of the head piece 4.

The head piece 4 is placed directly against and in facing relation with the crank 1, on which it rests through a flat transverse surface which is orthogonal to the axis of the crank pin 3. The crank head piece 4 also has a latch 6, which comprises a latch finger 7 movable in a direction which is substantially parallel to the axis of the crank pin 3 under the action of a suitable resilient means such as a spring 8.

Figure 4:
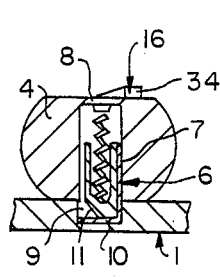
FIG. 4 is a view in cross section taken on the line IV—IV in FIG. 3.
Figure 5:
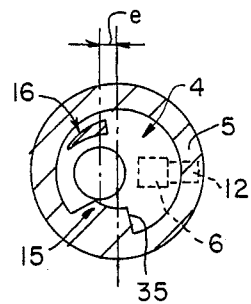
FIG. 5 is a view in cross section taken on the line V—V in FIG. 3.

The crank 1 has an opening 9 in which one end of the finger 7 is received as is best seen in FIG. 4. The bottom of the opening 9 is covered by a pad 10 of a sound deadening material, for example an elastomeric material. The center of the opening 9 lies in the plane which contains the axes of the motor shaft 2 and the crank pin 3, with the axis of the crank pin 3 lying between that of the motor shaft 2 and the opening 9 itself.

The lower end of the latch finger 7 has an inclined surface 11 on one side. The surface 11 cooperates with an adjacent edge of the opening 9 to raise the finger 7 out of the opening 9. On the opposite side to the surface 11, the finger 7 has another surface which is substantially orthogonal to the median plane of the crank 1, such that when this other surface comes into abutment against the adjacent wall of the opening 9, no reaction force is set up that would cause the finger 7 to move out of the opening 9. The crank head piece 4 is displaceable from right to left, as seen in FIG. 4, with respect to the crank 1 without being stopped by the finger 7. By contrast in movement relative to the crank 1 in the opposite direction the head piece 1 is stopped when the finger 7 is engaged in the opening 9.

As can be best seen in FIG. 2, the latch 6 leaves the crank head piece 4 free with respect to the crank 1 when the latter rotates in the clockwise direction indicated by the arrow F, but prevents relative rotational movement of the head piece 4 with respect to the crank when the latter rotates in the counter-clockwise direction.

The finger 7 also has a radial latch arm 12 which extends outwardly while the crosshead 5 has a recess 13 for receiving this arm 12. The recess 13 is open in the lower surface of the head 5, towards the crank 1, and is also open radially inwardly. The recess 13 may be located opposite to the opening 9 when the crank 1 and the connecting rod 8 are aligned and orientated in the same direction, as is shown in FIGS. 1 and 2. This configuration allows the length of the connecting rod to be maximised; however, in a modified version, it is possible to choose the position of the recess 13 such as to obtain any predetermined length for the connecting rod.

The position of the latch arm 12 and its thickness h (see FIG. 3) are so chosen that when the finger 7 is engaged in the opening 9, the arm 12 can pass between the face to face surfaces of the head 5 and the crank 1, abutting against the head 5 so as to prevent the finger 7 from leaving the opening 9.

In a preferred arrangement which is best seen in FIG. 10, a substantially planar friction ring 30 is firmly attached to the lower surface of the head 5, facing towards the crank 1. The friction ring 30 can be keyed to this surface in the manner shown in FIG. 11, by moulding it on to the head 5 so that some of the material of the latter flows into conical holes 31 formed in the friction ring.

Thus, if the latch arm 12, passing between the face to face surfaces of the head 5 and crank 1, rubs on the face of the head 5 which is directed towards the crank, the arm 12 slides on the friction ring which prevents any damage to the arm 12. In addition, and still referring to FIG. 10 the arm 12 may comprise a radially projecting portion 32 with a ferrule 33 coaxially mounted on it. The ferrule 33 is free to rotate on the projecting portion 32, but is prevented from moving along it by any suitable means, for example by a circlip. Of course, in this case the diameter of the ferrule 33 is equal to the thickness h of the arm described above, such that the arm, now comprising the projecting portion 32 with its ferrule 33, is able to pass between the above mentioned surfaces. When the arm 12 is in contact with the surface of the head 5, the ferrule then rolls on that surface, rotating around the portion 32 of the finger 7.

A resilient sealing gasket 14 is fitted between the crank 1 and the lower face of the head 5, so as to provide a dust seal around the crank head piece 4.

In the embodiment shown in FIGS. 1 to 5, when the crank 1 is rotating in its normal wiping direction (i.e. in the clockwise direction as seen in FIG. 2), the crank head piece 4 is coupled for rotation with the head 5, as will be described in more detail below, while the latch finger 7 bears on the upper face of the crank 1, while the latch arm 12 is engaged in the recess 13 of the head 5.

A stop means A (FIG. 2) is provided between the crosshead 5 and the crank head piece 4, to couple the head 5 and head piece 4 for rotation together when the crank 1 is rotating in the clockwise direction. The stop means A comprises a unidirectional abutment means in the form of an inward projection 15 of the head 5 and a ramp 16 on the upper transverse face of the crank head piece 4. The projection 15 and ramp 16 cooperate with each other, as can be seen for example in FIG. 2.

The ramp 16 preferably has an end face 34 which abuts against a side face 35 of the stop projection 15 the two faces 34 and 35 being substantially parallel with each other. They lie substantially in radial planes of the crank head piece 4, i.e. planes containing the axis of the latter.

Figure 12:
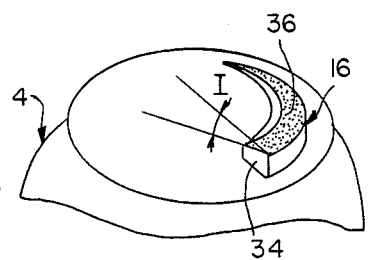
FIG. 12 is a detail view showing a further detail of an element of the mechanism.

As is best seen in FIG. 12, the outer circumferential face of the ramp 16, spaced above the upper external face of the crank head piece 4, rises from the latter towards the end face 34 in a first gradient at its outer edge, from which it slopes down in a second gradient defined by the angle of inclination I from the horizontal intersecting the first gradient. These two gradients together define the upper or ramp surface 36 of the ramp 16. The circumferential outer surface of the stop projection 15 is also formed as a ramp, complementary to the ramp surface 36.

Operation of the drive mechanism shown in FIGS. 1 to 5 is as follows. The normal wiping operation corresponds, as has already been indicated, to rotation of the crank 1 in the clockwise direction F as seen in FIG. 2. The latch finger 7 engages against the crank 1, and the latch arm 12 is engaged in the recess 13.

During this rotational movement of the crank 1 the head piece 4 rotates with the crosshead 5, due to the cooperation between the ramp 16 and stop projection 15, together with that between the arm 12 and its recess 13. It should however be noted that when the latch finger 7 and the opening 9 come into register with each other, the finger enters the opening, but immediately leaves it again because of the coupling maintained by the ramp 16 and stop projection 15. The sound deadening pad 10 suppresses, or at least considerably reduces, the sound of each entry of the finger 7 into the opening 9.

Figure 6:
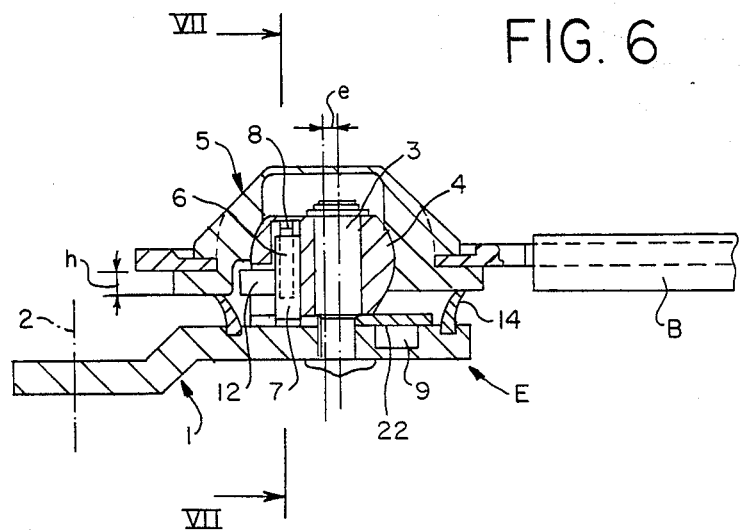
FIG. 6 is a view in cross section similar to that of FIG. 1, but showing a drive mechanism in which, for the normal wiping operation, a latch finger is in engagement with a friction ring.

FIG. 6, however, shows a preferred arrangement in which the sound deadening pad 10 is omitted. Instead, a friction ring 22 is interposed between the crank head piece 4 and crank 1. The friction ring 22 has a through opening 24 (FIGS. 7 and 8) which is sufficiently large to allow the finger to pass through it. A shoulder 23 is formed on the inclined surface 11 of the latch finger 7, in a zone close to the end of the finger. By means of this shoulder 23, the finger 7 drives the friction ring 22 in rotation with the head piece 4. The shoulder 23 also causes the finger 7 to be supported so that it will not fall into the opening 9 each time. Use of the friction ring 22 together with the shoulder 23 thus eliminates the above mentioned operating noise.

During the normal wiping operation, generally represented in FIG. 2, the crank head piece 4 occupies an angular position such that the eccentricity $\underline{e}$ reduces the effective length of the connecting rod B.

Movement to the "park" position of the wiper, when operation of the windshield wiper is no longer required, is obtained by reversing the rotation of the crank 1. As seen in FIGS. 1 and 2, when the crank 1 accordingly rotates in the counter-clockwise direction, the latch finger 7 enters into the opening 9 when the latch 1 occupies a position diametrically opposed to that shown in FIG. 2, that is to say when the crank 1 lies below the connecting rod B.

In this counter-clockwise rotation, the latch finger 7 is held in the opening 9 of the crank 1 in such a way that the head piece 4 is coupled to the crank 1 but is not coupled with the crosshead 5. Therefore, when the crank 1 is rotating back in the anti-clockwise direction, to the position seen in FIG. 2 in which it is aligned with the connecting rod so as to be in effect an extension of the latter, the crank head piece 4 rotates through 180° with respect to the crosshead 5, until it reaches the position shown in FIGS. 3 and 5. The eccentricity $\underline{e}$ is now additional to the length of the connecting rod B. Between the two positions shown in FIGS. 1 and 3, the connecting rod B has thus been effectively increased in length by an amount equal to 2e, and this causes the withdrawal of the windshield wiper or wipers which are actuated through the connecting rod.

Figure 7:
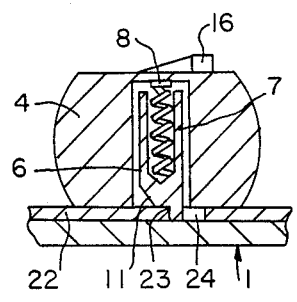
FIG. 7 is a view in cross section taken on the line VII—VII in FIG. 6.
Figure 8:
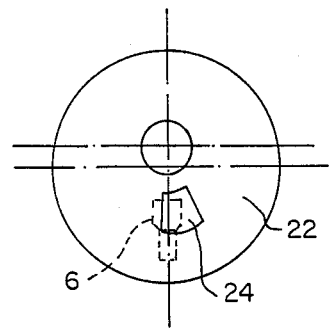
FIG. 8 is a top plan view of the friction ring.

Operation of the modified version of the drive mechanism shown in FIGS. 6 to 8 during counter-clockwise rotation is similar to that described above. The shoulder 23 of the latch finger 7 comes out of engagement with the ring 22 before the latter is displaced so as to follow the crank head piece 4. The finger 7 then drives the ring 22 through the edge of the hole 24 opposite the edge against which it engages in the clockwise direction of rotation. The finger 7 then drops into engagement in the opening 9.

The motor which drives the wiper shaft 2 is stopped, using conventional control means, with the crank 1 in the fixed stop position shown in FIG. 2 in which it is aligned with the connecting rod.

Reversal of the direction of rotation of the crank 1 can be obtained when it is either in this fixed stop position or in the opposite position. In the former case, the crank 1 performs a complete rotation in the counter-clockwise direction before the parking state is reached and the drive mechanism stopped. In the latter case the crank 1 performs only half a turn in the counter-clockwise direction before being stopped. It will be noticed that the radial latch arm 12 provides security in all phases of operation. Thus, as has already been described it is engaged, during the normal wiping operation, in the recess 13 and provides a coupling which is complementary to that provided by the stop projection 15 and ramp 16. When the mechanism is being put in its parking state, the radial arm 12 cooperates with the lower face of the crosshead 5, thus preventing the latch finger 7 from coming out of engagement with the opening 9, for example due to vibrations or jolts.

In addition, when the crank 1 is moving in the counter-clockwise direction, then if for example the operation of the electric motor is interrupted, the crank drives the crank head piece 4 in the counter-clockwise direction. Due to the disposition of the ramp surfaces provided on the stop projection 15 and ramp 16, these ramp surfaces slide over each other in such a way that the mechanism will once again find itself in an initial position without its operation having been disturbed.

At the beginning of a wiping operation, the crank 1 rotates in the clockwise direction (FIG. 2), while the head piece 4 rotates with the crank 1 relative to the crosshead 5, until the ramp 16 comes into abutment against the stop projection 15. In the example shown in the drawings, the head piece 4 will rotate through one half turn. It is then prevented from rotating further with respect to the head 5 but is movable with respect to the crank 1.

When the crank 1 is rotating, the latch finger 7 emerges from the opening 9 due to the cooperation of its inclined end face with the wall of the opening 9. This exit of the finger 7 from the opening is made possible by the fact that the recess 13 then lies in register with the radial latch arm 12.

The corresponding operation of the mechanism shown in FIGS. 6 to 8 is as follows. The shoulder 23 of the latch finger 7 engages the friction ring 22 and again drives it in a normal wiping operation. The friction ring 22 may be suitably roughened to improve the engagement between the cooperating surfaces of the crank head piece 4 and crank 1 through the friction ring. The connecting rod B has then reverted to its effective length for the normal cycle, and wiping proceeds until stopped.

Figure 9:
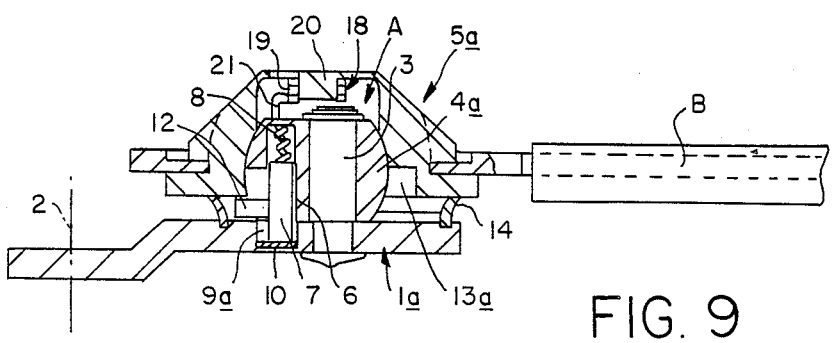
FIG. 9 is a view in cross section similar to FIG. 1, but showing a drive mechanism in which, in normal wiping operation, a crank head piece is coupled with a crank for rotation therewith.

Referring now to FIG. 9, this shows another possible embodiment. In FIG. 9, identical elements, or elements performing similar functions to elements already described with reference to FIGS. 1 to 5, are indicated by the same reference numerals as in FIGS. 1 to 5, but followed by the subscript a.

In the embodiment of FIG. 9, when the crank 1a is rotating in the direction corresponding to the normal wiping cycle, the crank head piece 4a is coupled with the crank for rotation with it, the latch finger 7 being engaged in the opening 9a of the crank. The center of the opening 9a is situated in the plane which passes through the axis of the drive shaft 2 and through the axis of the crank pin 3, but in this case it lies between these two axes. The radial latch arm 12a, during the normal wiping cycle, is engaged in the space lying between the crank 1a and the crosshead 5a.

The recess 13a is situated on the opposite side of the crank pin axis from the opening 9a when the crank 1a and the connecting rod B are aligned and orientated in the same direction, this being the situation shown in FIG. 9. Retarding means 18 in this example perform the same function as the stop means A previously described. The retarding means 18 are provided between the crosshead 5a and the crank head piece 4a, so as to couple the head 5a and head piece 4a together in rotation when the crank 1a is rotating in the direction opposite to that appropriate for the normal wiping cycle. The effect of this is to cause the finger 7 to move out of the opening 9a.

As shown in FIG. 9, the retarding means 18 comprise a helical friction spring 19 which is engaged around a pin 20 projecting below the top of the crosshead 5a. One end 21 of the spring 19 is anchored in an opening in the top face of the crank head piece 4a. When rotation is in the direction corresponding to the normal wiping cycle, the spring 19 does not exert any gripping force on the pin 20, but rotates freely with respect to it. However, when rotation is in the opposite direction, the spring 19 grips the pin 20 and so retards the crank head piece 4a with respect to the head 5a. In place of the friction spring 19, other suitable rotary retarding means could be provided, for example a free wheel or a resilient retarding member.

Operation of the mechanism shown in FIG. 9 will be readily deduced with reference to the description of the operation given above with reference to FIGS. 1 to 5.

In the normal wiping cycle, the crank head piece 4a is coupled to the crank 1a through the latch finger 7a. The latch arm 12 prevents any inadvertent disengagement of the finger 7 from the crank.

When the direction of rotation of the crank 1a is reversed the spring 19 contracts around the pin 20 and thus couples, by friction, the crank head piece 4a with the crosshead 5a. The crank head piece is then driven in rotation around the crank pin 3 by the head 5a, in the direction which causes the finger 7 to disengage from the opening 9a when the rotational position of the head 5a with respect to the crank 1a is such that the recess 13a is in register with the latch arm 12.

The recess 13a will come into register with the arm 12, the latch finger 7 being engaged in the opening 9a, when the crank 1a has rotated through 180° from the position shown in FIG. 9, that is to say it has reached the position opposite to that of parking.

If, with the crank in this position opposed to that of the parking state, its direction of rotation is changed so as to place the wipers in the parking state, the latch finger 7 immediately moves out of the opening 9a. The retarding means 18 may be arranged so as to prevent any relative movement between the head 5a and the head piece 4a in this reverse direction of rotation. It is also possible as has already been suggested, to use some other kind of retracing means, such as a free wheel which will prevent the above mentioned relative rotation when the direction of rotation is reversed.

When the direction of rotation of the crank 1a is reversed so as to park it in the position shown in FIG. 9, the crank 1a has to perform one complete turn in the reverse direction in order to achieve the parking state. During the first half of this turn in the reverse direction, the latch finger 7 remains in the opening 9a, since the recess 13a is not in register with the latch arm 12 (which would allow the finger to disengage from the opening 9a). The retarding means 18, which are operative when the direction of rotation is reversed, must therefore allow sliding friction of the head 5a to take place with respect to the spring 19.

In a further embodiment, of the kind comprising, for example, a central linkage in which two connecting rods are articulated on the driving crank, one below the other, it is possible to integrate the retarding means with the upper crosshead and the eccentric means with the lower crosshead. This arrangement allows a number of different angles of sweep of the windshield wipers to be obtained merely by modifying the indentation with respect to the crank.

Whatever type of embodiment is adopted, the mechanism of the invention is of simple construction with a minimum number of components, and is reliable in operation.

What is claimed is:

1. A drive mechanism for a windshield wiper allowing a windshield wiper blade associated with the mechanism to be placed in a retracted, parking state, the mechanism comprising a crank having means at a first end thereof for coupling it with a drive motor, a crank pin closer to the other end of said crank and carried thereby, a crank head piece carried eccentrically on said crank pin, a crosshead pivoted on said crank head piece, a latch carried by said crank head piece, said latch comprising a latch finger and resilient means associated with said latch finger for urging the latter in a direction substantially parallel with the axis of said crank pin, selective coupling means including said latch for, in a first direction of rotation of said crank, maintaining said crank and crank head piece uncoupled from each other and, in a second opposite direction of rotation, coupling them together for simultaneous rotational movement, stop means for coupling said crosshead and crank head piece for rotation together during rotation of said crank in said first direction, the arrangement being such that, in normal wiping operation, said crank rotates in a direction in which the position of the eccentric said head piece remains constant with respect to one of said crosshead and said crank, whereas, when the direction of rotation of said crank is reversed, said crank head piece and said one of said crosshead and said crank are caused to undergo relative rotation, whereby to cause the degree of eccentricity to change so as to bring the wiper into the retracted parking state, and said latch finger including an outwardly directed radial latch arm, said crosshead having a recess to receive said latch arm, and said crank having an opening for receiving a free end of said latch finger, the position and thickness of said latch arm being such that, when said latch finger is engaged in said opening in said crank, said latch arm is situated between face to face surfaces of said crosshead and of said crank, respectively, to prevent said latch from disengaging from said opening by abutment of said latch finger against said crosshead, said crank head piece being mounted in facing relationship with said crank.

2. A mechanism according to claim 1, wherein said selective coupling means are such that, in the direction of rotation of said crank corresponding to normal wiping operation, said crank head piece is coupled in rotation with said crosshead, said latch finger being arranged so that in normal wiping operation it lies against the upper face of said crank while said radial latch arm is engaged in said recess of said crosshead, said stop means comprising unidirectional abutment means for effecting said coupling of said crosshead and crank head piece in simultaneous rotation.

3. A mechanism according to claim 2, wherein said unidirectional abutment means comprise an inwardly directed stop projection formed in said crosshead, and a ramp on the upper face of said crank head piece for cooperating with said stop projection.

4. A mechanism according to claim 3, wherein said opening formed in said crank for receiving said latch finger has a center situated in a plane containing the axis of said crank pin and an axis of rotation of said crank, said crank pin axis being located intermediate between said axis of rotation of said crank and said opening.

5. A mechanism according to claim 1, further comprising a friction ring interposed between said crank head piece and said crank, said friction ring comprising means for preventing said latch finger from entering said opening in said crank during normal wiping operation.

6. A mechanism according to claim 5, wherein said latch finger has an inclined face in a zone thereof close to the free end thereof, and further comprising a shoulder formed on said inclined face for engaging and driving said friction ring during normal wiping operation.

7. A mechanism according to claim 5, further comprising a through hole formed in said friction ring for passage therethrough said latch finger when said crank is rotating in said opposite direction.

8. A mechanism according to claim 1, further comprising a friction ring mounted on a surface of said crosshead facing towards said crank.

9. A mechanism according to claim 1, wherein said latch arm comprises a projecting portion carried by said latch finger and a ferrule rotatably mounted on said projecting portion.

* * * * *